United States Patent [19]
Wenger et al.

[11] 3,777,241
[45] Dec. 4, 1973

[54] CONTROL SPECIFICALLY FOR ANIMAL BUILDINGS

[76] Inventors: Caleb M. Wenger; Lester E. Wenger, both of R.D. No. 1, Quarryville, Pa. 17566

[22] Filed: May 24, 1971

[21] Appl. No.: 146,043

[52] U.S. Cl. .................................. 318/480, 49/31
[51] Int. Cl. ............................................ H02p 1/22
[58] Field of Search ...................................... 49/31; 318/264–267, 272, 275, 471, 473, 480

[56] References Cited
UNITED STATES PATENTS

| | | | |
|---|---|---|---|
| 3,601,675 | 8/1971 | Radtke | 318/471 |
| 3,272,982 | 9/1966 | Stewart | 318/480 |
| 3,346,772 | 10/1967 | Mierendorf | 318/473 |
| 3,450,969 | 6/1969 | Sato | 318/480 |
| 3,543,119 | 11/1970 | Bauer | 318/471 |

Primary Examiner—Bernard A. Gilheany
Assistant Examiner—Thomas Langer
Attorney—Jackson, Jackson and Chovanes

[57] ABSTRACT

A control for animal buildings which includes a sensing variable resistor, which may for example change its resistance with change of sunlight, temperature, wind velocity, wind direction, or evaporation. It operates louver covers to admit or exclude sunlight, air, wind etc. to an animal building, preferably of the type which has louvers in a sloping roof directed toward the south. A circuit is included which has a sensing resistor, transistor switch operated by the sensing resistor, a relay operated by the switching transistors and in the preferred embodiment a reversible motor drum and cables operated by the relay. There are electronic time delay means between the sensing resistors, and the transistor switching unit.

12 Claims, 4 Drawing Figures

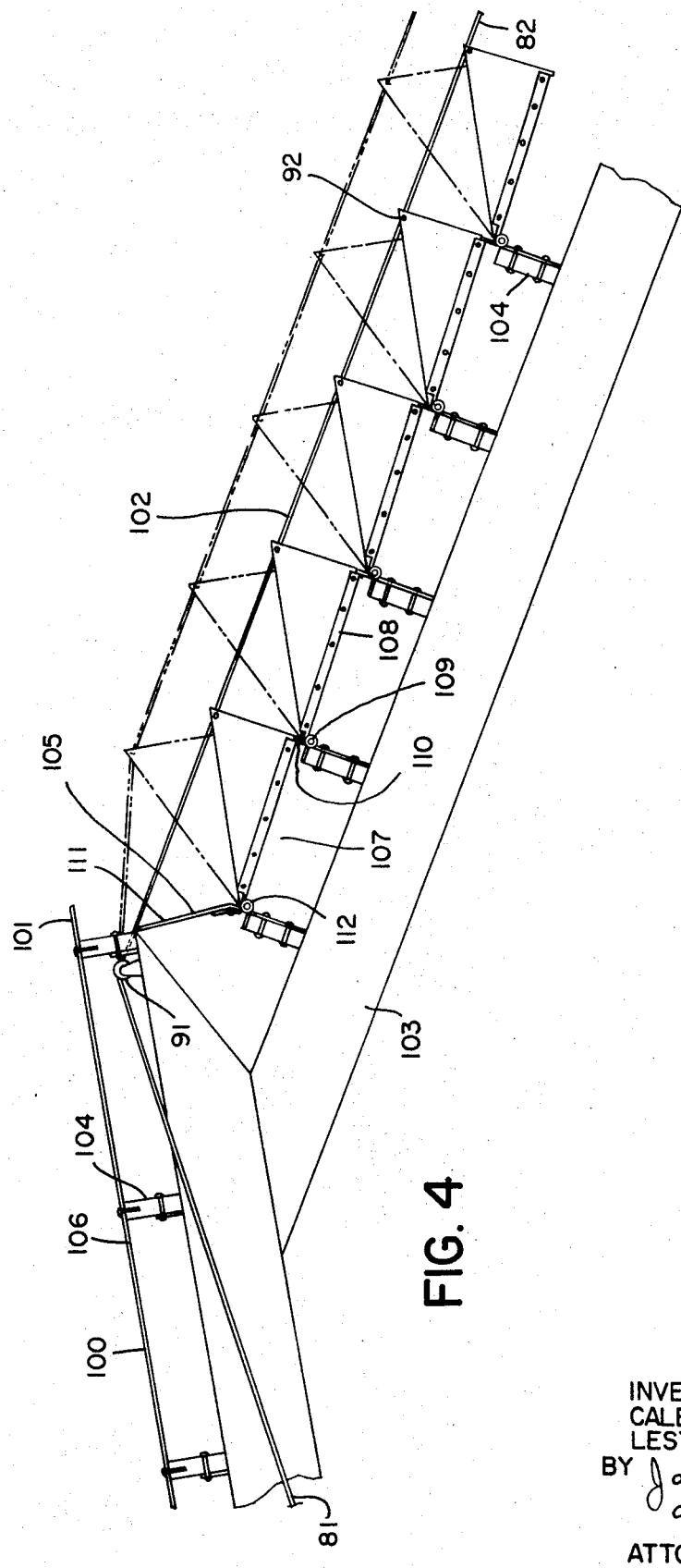

CONTROL SPECIFICALLY FOR ANIMAL BUILDINGS

DISCLOSURE OF INVENTION

The present invention relates to control means, preferably for ventilation of an animal building, by opening and closing louver covers in the roof, in response to or absence of sunlight, or of a critical temperature, a wind of a particular direction, a wind of a particular velocity, or presence or absence of precipitation. The invention is preferably applied to ridge roof buildings (called coupled rafter roofs in the Encyclopedia Britannica) in which one side of the sloping roof from the ridge has louvers, is oriented toward the south and in which it preferably slopes more steeply than the other side of the sloping roof from the ridge as explained more in detail in U.S. Pat. No. 3,556,055, issued Jan. 19, 1971, for Building for Animals and the U.S. Pat. application Ser. No. 104,976, filed Jan. 8, 1971 for Building for Animals, incorporated herein by reference.

In the preferred embodiment a special electronic circuit includes a sensing resistor, transistor switching units which produce an output depending upon the resistance of the sensor resistor, a relay responding to the output, and a servomechanism such as a reversing motor and drum which operates the louver covers.

In the preferred embodiment a controlled delay in operation is interposed by an electronic timer, suitably having a timer capacitor and timer resistors in series and in parallel relation to the timer capacitor, and controlling the voltage which actuates the transistor switching unit.

In the drawings we have shown a preferred embodiment of the electronic circuit and means for actuating that circuit to actuate the louver covers.

FIG. 4 is a fragmentary vertical section showing the animal building and the louvers of the invention and the application of the control to the louver covers.

Figure 2:
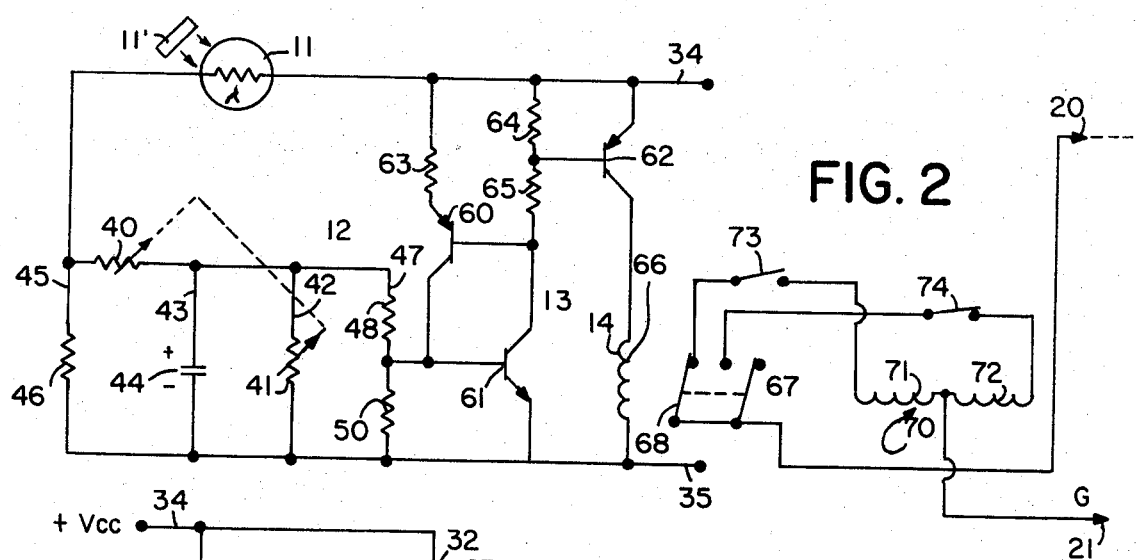
FIG. 2 is an illustrative electrical diagram of the control unit used for the invention.

The device includes in its main parts a power pack 10, a sensor 11 (preferably a photoresistor), a time delay network 12, a transistor switching device 13 and a relay 14.

Any of a variety of different sensors can be substituted for the sensor 11 (instead of the photoresistor); for example it may be replaced with a temperature sensitive resistor or a wind pressure switch and resistor which varies the resistance with wind pressure, or a wind direction indicator. The sensor can be exposed at any convenient place where it will respond to the presence or absence of the sun or other controlling quantity.

Figure 1:
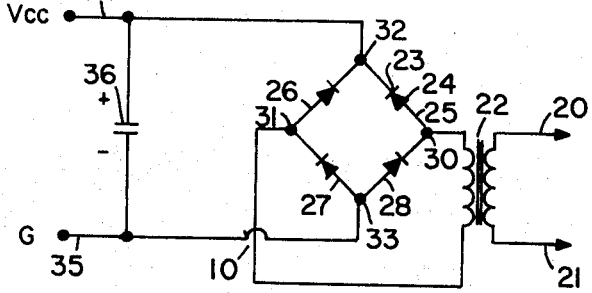
FIG. 1 is an illustrative electrical diagram of the power pack used for the control of the invention.

Taking the current from suitable AC power leads 20 and 21, FIG. 1, the voltage is stepped down by transformer 22 and it energizes a full wave rectifier 23, suitably a silicon rectifier, having four rectifier units positioned with their cathodes 24 in sequence around the branches of the rectifier network, which may be designated 25, 26, 27, and 28.

Between branches 28 and 25 is terminal 30 to which one side of the secondary of transformer 22 is connected and the other side of the transformer secondary is connected to terminal 31 between branches 26 and 27. Rectified current is taken off at terminal 32 (plus) between branches 25 and 26 and at terminal 33 between branches 27 and 28 and the rectified current supplies lead 34 and 35 (which may be grounded), shunted by filtering capacitor 36.

In FIG. 2, connected to lead 34, in series therewith, is the resistor of the sensor unit 11 just described, and also timer network 12 which is connected across to ground. The timer network involves a potentiometer having resistors 40 and 41 adjustable in unison, the resistor 40 being connected to the opposite side of the sensor resistor from the power lead 34, and the resistor 41 being connected in a branch 42 of a group of parallel branches across to the ground and in series with the resistor 40.

Another branch 43 is in series with the resistor 40 but in parallel with the branch 42 and contains capacitor 44 whose charge and discharge controls the time delay.

Also in parallel with the branches 42 and 43 but not in series with the resistor 40 is branch 45 which includes fixed resistor 46 connected to ground. In parallel with branch 42 and 43 and in series with resistor 40 is branch 47 having resistors 48 and 50.

The transistor switching unit 13 includes three transistors 60, 61 and 62, which may be general purpose switching transistors, of which transistors 60 and 62 are PNP type and transistor 61 is of the NPN type. Transistors 60 and 61 are the main switching transistors and transistor 62 matches the impedance of the relay. The transistor 60 has its emitter connected through resistor 63 to the power lead 34 and has its collector connected to an intermediate point between resistors 48 and 50. The transistor 61 has its emitter connected to ground through the power lead 35 and its base connected to the intermediate point between resistors 48 and 50. The base of transistor 60 is connected to power lead 34 through resistors 64 and 65 which are in series and are connected to the collector of transistor 61.

Thus in each of the switching transistors 60 and 61, on the input side connection is made to the collector of the PNP transistor and to the base of the NPN transistor and on the output side connection is made to the collector of the NPN transistor and to the base of the PNP transistor. The emitter of the PNP transistor is connected to the high side of the power source, and the emitter of the NPN transistor is connected to the low side of the power source.

Transistor 62 has its base connected intermediate between resistors 64 and 65, has its emitter connected to the high side 34 of the power line and its collector connected to one side of the coil 66 of relay 14, the other side of which is connected to power lead 35 and ground.

Relay 14 has two switching circuits 67 and 68 and energization of the relay closes one of these circuits and opens the other of these circuits and vice versa. An electric motor 70 which may be of the induction type has two opposed field coils 71 and 72, respectively in the circuit 67 or 68 in series with limit switches 73 and 74 to be described, which are of the type in which one is always open when the other is closed. The intermediate point between the field coil 71 and 72 is connected to the power lead 21 and to ground, and the high side of the circuits 67 and 68 is connected to the power lead 20.

MODE OF OPERATION

When the sensing unit is dark (when a photoresistor of selenium type is used), it will be of high resistance and therefore it actuates the voltage divider provided by the timer network in such a way that the timer is subjected to a low voltage. This mode discharges residual charge on the capacitor 44 to the extent that the timer comes to a steady state and remains stable until such time that the sensor conditions change. The voltage output of the timer is monitored by the transistor switching unit 13. Under this condition the minimum threshold voltage of the switching unit is realized, that is, the voltage to the switching unit goes down to the point required to change the switching unit to the off state; hence, the switch is in an off mode, and the relay is not energized. When sun comes to the sensor 11, through filter 11', it vastly reduces its resistance and vastly increases the voltage on the voltage divider and the timer network 12. With the high voltage increase on the timer network, the capacitor will charge until such time that the output of the timer network again being monitored by the switching unit passes a switch threshold voltage and thereby triggers the switching unit into an on mode and therefore triggers the relay on. The time delay on is equal to the time delay off and equals the time which it takes for the charge or discharge of the capacitor to adjust from one mode to another.

Adjusting the values of the potentiometer resistors 40 and 41 changes the time delay. Thus increase of the resistor 40 and 41 lengthens the time delay, and decrease of the resistors 40 and 41 reduces the time delay.

In case instead of a photoresistor the sensing resistor 11 is a thermistor or other temperature measuring device the functioning will be the same. In case the sensing unit is a wind pressure indicator which has two modes of operation, one a high resistor and one a low resistor as accomplished for example by mechanical switching in the wind indicator, the mode will be the same. Similarly, the sensor 11 can be a wind direction indicator which by mechanical switching therein reduces or increases the resistance of the sensor 11 and exerts control.

While in the invention we have shown a timer which delays the actuation of the transistor switching unit so that the device will not respond to a momentary change in sunlight, temperature or wind characteristics, it will be evident that in the broadest aspects of the invention the change in response of the sensing unit may directly operate the transistor sensing unit without the delay.

Figure 3:
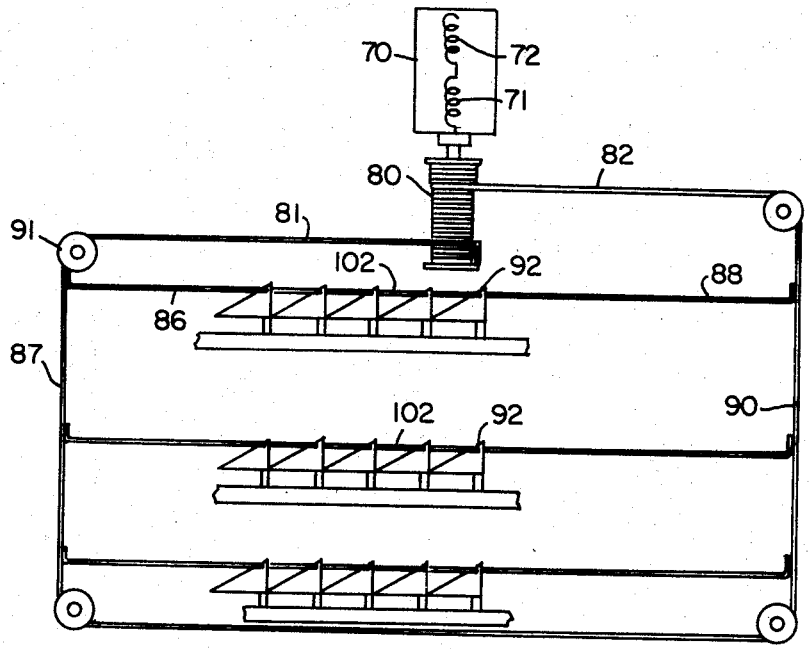
FIG. 3 is a diagram showing the drum and cables controlled by the relay.

FIG. 3 shows diagrammatically a rotatable drum 80 which has a cable 81 wound thereon at one end and a cable 82 wound thereon on the other end, the winding of the cable 81 and 82 being in opposite directions so that one winds and one unwinds. This can be one cable if desired.

The drum is driven by the reversing motor 70 as previously described.

The cables 81 and 82 branch at 86 and 87 on one end and at 88 and 90 on the other end, the branches running over suitable pulleys 91 and being connected at 92 in an operative way to the ventilating devices to open them or close them depending on whether cable 81 or 82 is pulling. Thus, the device opens or closes the ventilating louvers by pulling on cable 81 or 82 as desired. It will be evident that the cables cut off the motor in either direction by limit switches 73 or 74. These limit switches are capable of being adjusted to shut off the motor when the ventilators are partially open or completely open or partially or completely closed as desired. The limit switches limit the function of the motor in either direction and when one limit switch is open, the switch in the other direction is closed.

APPLICATION OF CONTROL DEVICE TO BARNS AND THE LIKE

The present invention is a further development on the subject matter involved in Wenger et al., U.S. application Ser. No. 104,976 for Building for Animals, filed Jan. 8, 1971, now pending in the United States Patent Office, and Wenger U.S. Pat. No. 3,556,055, issued Jan. 19, 1971 on application Ser. No. 809,234, filed Mar. 21, 1969 for Building for Animals.

It is especially intended to be used in a building for animals such as found in the first mentioned application, and this also can be used with other buildings for animals which have the capability of control of sunlight and/or ventilation and/or water shedding, that is the closing of openings in the roof if there is likelihood of precipitation.

Where the control device is based on the sunlight, this can for example be used to admit large amounts of sunlight during sunny periods in the cold season, and to close the openings, partially or entirely, when the sun is not shining.

When the sensing device is based on temperature, it can, for example, be used to open ventilating access during periods of special heat during the warm season, and close this partly or entirely when the temperature is less warm. Also, in winter it can close the louvers when weather of inclement type is encountered if the louvers are desired to be opened during the less severe cold.

Both these features of sun response and temperature response can be combined in one setup, so that there can be further regulation based on sunlight, and with the addition, for example, of a manual switch to put the thermostatic control into operation of temperature control during the warm season.

It will be evident that this can be done especially for example on the device of the above mentioned application that is now pending.

Especially in some places where the wind is especially likely to be irregular and to be a disturbing factor in the regulation of the well being of the animals in the building, as, for example, where mountain conditions may control prevailing winds, the wind direction or pressure regulator may be available. This and the other controls are especially important in eliminating or reducing the tendency toward fouling of the air in view of the presence of the large number of animals in a comparatively small space. The wind control can, for example, be used to close the louvers of a building like that in the pending application, when a wind is coming from an unusual or undesirable direction irregularly to the placement of the building, as, for example when the wind is continuing to blow in strength into the louvers themselves and then into the building. This would be especially important in the cooler weather.

In what is said above, it is not intended to limit the application of the invention to a building of the type and orientation described in the patent and application, but it also applies to animal buildings of other types and orientations which have louvers or other means of admitting sun or air or both or water vapor and the like and other such things.

EXAMPLE OF APPLICATION TO AN ANIMAL BUILDING

In FIG. 4 the building has a ridge roof having a greater roof portion 100 running to a ridge 101 and a lesser roof portion 102. The roof is supported by roof beams 103 on which beams or nailers 104 extend longitudinally of the roof. At the ridge 101 the greater roof section 100 is above the lesser roof section 102 to provide a vent 105 which can be used to ventilate the interior of the building. The permanent roof sections are made by securing sheets 106 of metal or the like to the nailers. At suitable points along the greater roof section there may be a sky light. The lesser roof section is preferably disposed toward the south and has at suitable points running transverse to the slope of the roof louvers 107 having covers 108 preferably of metal or a suitable sheet material, conveniently hinged at 109 and closing with respect to the lower louver in closed position at 110, controlled by cables 81 and 82 suitably fastened to each louver at 92 as already described. The vent 105 is preferably closed by a vent cover 111 hinged at 112, suitably controlled manually.

In the specific embodiment of the circuit of FIGS. 1 and 2, the following dimensions of components are desirable for a specific embodiment.

| | |
|---|---|
| Output of Power Pack | 12 volts |
| Filtering Capacitor | 1500 microfarads |
| Comparative Size of Potentiometer Resistors | |
| Resistor 40 | 500,000 ohms |
| Resistor 41 | 1 megohm |
| Timing Capacitor | 1500 microfarads |
| Resistor 46 | 6800 ohms |
| Resistor 48 | 820,000 ohms |
| Resistor 50 | 100,000 ohms |
| Resistor 63 | 680,000 ohms |
| Resistor 64 | 330 ohms |
| Resistor 65 | 4700 ohms |

In view of our invention and disclosure, variations and modifications to meet individual whim or particular need will doubtless become evident to others skilled in the art, to obtain all or part of the benefits of our invention without copying the mechanism shown, and we therefore claim all such insofar as they fall within the reasonable spirit and scope of our claims.

Having thus described our invention, what we claim as new and desire to secure by Letters Patent is:

1. In a control mechanism for controlling ventilation, a sensing element having a variable resistor, a transistor switching mechanism energized and connected to the sensing mechanism to respond to its change in resistance, a relay connected to the output side of the transistor switching mechanism, a series of ventilators, and means controlled by energizing the relay to operate the ventilators, in which the transistor switching mechanism includes a PNP junction transistor and a NPN junction transistor, the input side of the switching mechanism being connected with the collector of the PNP junction transistor and the base of the NPN junction transistor being also connected to the input, and the output side of the transistor switching mechanism being connected with the collector of the NPN junction transistor, and the base of the PNP junction transistor being connected to the output, the respective emitters of the transistors being connected to the high and low side of the power source.

2. A mechanism in accordance with claim 1, having a time delay network interposed between the sensing resistor and the input of the transistor switching mechanism.

3. A mechanism of claim 2, in which the time delay network includes a time delay capacitor and time delay resistors, a first time delay resistor being connected in series with the capacitor between the sensing resistor and the input of the switching transistors, and a second time delay resistor being connected in parallel with the condenser and in series with the first time delay resistor.

4. A mechanism of claim 3, in which the first and second time delay resistors are part of a potentiometer, which includes means for increasing and reducing their resistance in unison.

5. A mechanism of claim 4, in which the time delay network also includes a third time delay resistor in parallel with the first time delay resistors and with the capacitor.

6. A mechanism of claim 5, in which the time delay network also includes a fourth time delay resistor and a fifth time delay resistor which are in series with the first time delay resistor and in parallel with the capacitor, and the second time delay resistor, the input of the switching transistors being connected between the fourth and fifth time delay resistors.

7. A mechanism of claim 6, in which the switching transistor mechanism includes a first PNP junction transistor, a second NPN junction transistor and a third PNP junction transistor, and first, second and third switching resistors, the first transistor being connected with its collector on the input side, its emitter connected through the first switching resistor to the high side of the power source and its base connected through the second switching resistor to the base of the third switching resistor, the second switching transistor having its base connected to the input, its emitter connected to the grounded side of the power source, and its collector connected to the second switching resistor and through it to the base of the third switching transistor, the third switching resistor being connected between the base of the third switching transistor and the high side of the power source, the emitter of the third switching transistor being connected to the high side of the power source, and the collector of the third switching transistor being connected to one side of the relay.

8. In a control mechanism, a device to be under control, electromechanical means to operate the device, relay means to energize and deenergize the electromechanical means, a sensor including a variable resistance operatively connected in the circuit and a transistor switching unit operatively connected at the input side to the sensor resistor and the output side to the relay including a PNP junction transistor and a NPN junction transistor, the PNP junction transistor havings its collector connected to the input and the NPN junction transistor having its base connected to the input, the PNP junction transistor having its base connected to the output and the NPN junction transistor having its collector connected to the output and the transistors having their emitters connected across the power source.

9. A mechanism of claim 8, including a time delay network between the sensor resistor and the input of the switching transistors, evaluating the presence and intensity of the sun, said time delay network including a first and a second time delay resistor, a time delay capacitor in series with the first time delay resistor and in parallel with the second time delay resistor, the said first and second time delay resistors being gang connected so that they can increase and reduce their resistance in unison.

10. A mechanism of claim 9, in which the time delay network includes a third time delay resistor in series with the sensor resistor and in parallel with the series connected first time delay resistor and capacitor, and a fourth and fifth time delay resistor in parallel with the capacitor and in parallel with the second time delay resistor but in series with the first time delay resistor, the output to the transistor switching unit being connected intermediate between the fourth and fifth time delay resistors, and the fifth time delay resistor being connected to ground.

11. In a control mechanism for controlling ventilation, a sensing element having a variable resistor, an integrating time-delay means receiving the signal from the sensing element and responsive to its time and intensity, a transistor switching means energized by and connected to the time-delay means to respond to it after an interval determined by it if the time and intensity is sufficient to cause any response, a relay connected to the output side of the transistor switching mechanism, a series of ventilators, and means controlled by energizing the relay to operate the ventilators.

12. In a control for ventilators, a sensing resistor whose resistance is responsive to the duration and intensity of a quantity sensed, means providing a steady state voltage imposed on the sensing resistor, an electronic timer having a capacitor in circuit with the sensing resistor and the source of steady stage voltage, a transistor switching unit responsive to the voltage from the capacitor, relay means receiving the output from the switching unit, a reversible motor having two fields, one field for each direction of operation, limit switches electrically connected to the fields and mechanically connected to the ventilators, one of which is closed when the other is open corresponding to the position of the ventilators, and circuit means connecting the relay means, the switches and the fields with a source of electric power.

* * * * *